(12) United States Patent
Fujita et al.

(10) Patent No.: US 7,242,596 B2
(45) Date of Patent: Jul. 10, 2007

(54) CONTROL METHOD FOR SWITCHING POWER SUPPLY CIRCUIT

(75) Inventors: Kenji Fujita, Tokyo (JP); Yukihiro Nishikawa, Tokyo (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 188 days.

(21) Appl. No.: 11/206,118

(22) Filed: Aug. 18, 2005

(65) Prior Publication Data

US 2006/0198168 A1 Sep. 7, 2006

(30) Foreign Application Priority Data

Mar. 7, 2005 (JP) ............................. 2005-061893

(51) Int. Cl.
*H02M 3/335* (2006.01)
(52) U.S. Cl. .............................. 363/21.13; 363/21.05; 363/97
(58) Field of Classification Search ............. 363/21.01, 363/21.04, 21.05, 21.07, 21.08, 21.12, 21.13, 363/21.15, 21.16, 97
See application file for complete search history.

(56) References Cited

U.S. PATENT DOCUMENTS

| | | | | |
|---|---|---|---|---|
| 4,849,869 | A * | 7/1989 | Tanuma et al. | 363/21.13 |
| 5,453,921 | A * | 9/1995 | Shutts | 363/21.18 |
| 5,852,550 | A * | 12/1998 | Majid et al. | 363/21.05 |
| 6,118,675 | A * | 9/2000 | Lionetto et al. | 363/21.13 |
| 6,134,123 | A * | 10/2000 | Yamada | 363/21.13 |
| 6,445,598 | B1 * | 9/2002 | Yamada | 363/21.12 |
| 6,519,165 | B2 * | 2/2003 | Koike | 363/21.12 |
| 6,944,034 | B1 * | 9/2005 | Shteynberg et al. | 363/21.13 |
| 6,980,444 | B2 * | 12/2005 | Takahashi | 363/21.18 |
| 7,035,119 | B2 * | 4/2006 | Koike | 363/19 |
| 7,116,564 | B2 * | 10/2006 | Takahashi | 363/21.16 |

FOREIGN PATENT DOCUMENTS

| | | |
|---|---|---|
| JP | 2000-50626 | 2/2000 |
| JP | 2002-136125 | 5/2002 |
| JP | 2003-299356 | 10/2003 |

\* cited by examiner

*Primary Examiner*—Jeffrey Sterrett
(74) *Attorney, Agent, or Firm*—Manabu Kanesaka

(57) ABSTRACT

A control method for controlling a switching power supply circuit has a control circuit including a setting device that limits the exciting current of a transformer at the time of changeover from a switching delay to a switching period. The setting value set by the setting device is changed slowly to prevent the exciting current of transformer from changing rapidly and to reduce the excitation noise of transformer, and the setting value is changed gradually to prevent the output voltage from lowering even when the load becomes heavier than a certain value during the light load operation. The control method facilitates reducing the electric power consumption of the switching power supply circuit under a light load, reducing the transformer excitation noise and preventing the output voltage from lowering when the load is light.

8 Claims, 12 Drawing Sheets

CONTROL METHOD FOR SWITCHING POWER SUPPLY CIRCUIT

BACKGROUND OF THE INVENTION AND RELATED ART STATEMENT

The present invention relates to a control method for controlling a switching power supply circuit that has a delay, for which switching is not conducted, to reduce the power consumption thereof when the load is light. Specifically, the present invention relates to a control method that facilitates reducing the transformer excitation noise and stabilizing the switching operations thereof.

Some conventional switching power supply circuits set a switching delay or pause, to stop the switching operations of the switching devices thereof for reducing the power consumption thereof when the load is light. However, the exciting current that flows through the transformer changes greatly at the changeover between the switching period and the switching delay, for which the switching is stopped, causing transformer excitation noise.

Japanese Patent document JP P 2002-136125 A discloses a switching power supply circuit that is directed to obviate the problems described above. The disclosed switching power supply circuit limits the peak value of the transformer exciting current to a certain value to reduce the transformer excitation noise.

FIG. 10 is a block circuit diagram of the switching power supply circuit disclosed in JP 2002-136125 A.

Referring now to FIG. 10, the disclosed switching power supply circuit includes a DC power supply 1, a first switching device 2, a control circuit 3, an output voltage feedback circuit 5, a transformer 6, a rectifying diode 7, a rectifying capacitor 8, a current detecting resistor 10, and a current limiting resistor 11. The control circuit 3 switches on and off first switching device 2. Output voltage feedback circuit 5 includes resistors 13, 14, 16, 19, and 20; a shunt regulator 15; a capacitor 17; and photocouplers 18a and 18b. Transformer 6 including a primary winding 6a, a secondary winding 6b, and a control winding 6c. Rectifying capacitor 8 and diode 7 smooth the output of the switching power supply circuit. A load 9 is also shown in FIG. 10.

The main circuit shown in FIG. 10 operates in the following manner. A voltage is generated via primary winding 6a across secondary winding 6b in transformer 6 by inducing the first switching device 2 switch on and off the DC voltage from power supply 1. The voltage generated across secondary winding 6b in transformer 6 is rectified by diode 7 and capacitor 8 and converted to a DC voltage. Output voltage feedback circuit 5 lowers the feedback signal thereof when the DC voltage described above rises so that the output voltage may be stabilized at a desired value.

FIG. 11 is a block circuit diagram of the control circuit shown in FIG. 10. Referring now to FIG. 11, control circuit 3 includes a driver circuit 101 that drives switching device 2, a start pulse generator circuit 104, an ON-OFF RS flip-flop 105 for switching ON and OFF, an ON-timing-signal outputting circuit 106, a normal- and waiting-modes-changeover-signal outputting circuit 107 for changing over the normal mode to the waiting mode or vice versa (hereinafter referred to simply as a "changeover-signal outputting circuit"), a waiting mode RS flip-flop 111 used for the waiting mode, a switching stop comparator 113 for stopping switching, a switching start comparator 115 for starting switching, a waiting mode comparator 121 used for the waiting mode, a normal mode comparator 123 used for the normal mode, a constant current supply 117, constant voltage supplies 112, 114, 116, and 122, AND gates 103, 124, and 126, a NOT gate 125, and an OR gate 127.

The control circuit shown in FIG. 11 operates in the following manner. First, the normal mode of operations when the load is light will be described.

As the power supply to control circuit 3 is established, start pulse generator circuit 104 outputs start pulses to set ON-OFF RS flip-flop 105. As ON-OFF RS flip-flop 105 is set, driver circuit 101 makes switching device 2 ON via the output terminal a of control circuit 3. As a current flows through switching device 2, a voltage is generated across current detecting resistor 10 and the voltage proportional to the current value is inputted to the input terminal d of control circuit 3.

Normal mode comparator 123 compares the current value signal inputted from the input terminal d of control circuit 3 with the feedback signal inputted to the input terminal b of control circuit 3. When the current value signal is higher than the feedback signal, normal mode comparator 123 outputs an OFF-signal (H-level). Since changeover-signal outputting circuit 107 is outputting a normal mode signal (L-level) at this timing, the output of AND gate 124 and the output of OR gate 127 are set at the H-level. As the output of OR gate 127 is set at the H-level, ON-OFF RS flip-flop 105 is reset. As ON-OFF RS flip-flop 105 is reset, driver circuit 101 switches off switching device 2 via the output terminal a. As the switching device 2 is switched off, a voltage is generated across secondary winding 6b in transformer 6 and energies are fed to capacitor 8 and load 9 through diode 7.

As the energy discharge is completed, the voltage generated across secondary winding 6b in transformer 6 reduces. At the same time, the voltage generated across control winding 6c in transformer 6 connected to the input terminal c also reduces. As ON-timing-signal outputting circuit 106 detects the trailing edge of the voltage generated across control winding 6c and inputted to the input terminal c, ON-timing-signal outputting circuit 106 sets ON-OFF RS flip-flop 105. As ON-OFF RS flip-flop 105 is set, driver circuit 101 switches on switching device 2 via the output terminal a. As a current flows through switching device 2 and the current value signal exceeds the feedback signal to the higher side, normal mode comparator 123 outputs an OFF-signal.

As the OFF-signal is outputted, ON-OFF RS flip-flop 105 is reset and driver circuit 101 switches off switching device 2. Control circuit 3 switches on switching device 2 in response to the ON-signal from ON-timing-signal outputting circuit 106 or the ON-signal from start pulse generator circuit 104. Control circuit 3 switches off switching device 2 in response to the OFF-signal from normal mode comparator 123. Control circuit 3 controls the ON-period of switching device 2 to stabilize the output voltage of the switching power supply circuit at a desired value.

Now, the waiting mode of operations when the load is light will be described below.

Switching start comparator 115 compares the feedback signal with the voltage from constant voltage supply 114. As the feedback signal exceeds the switching start voltage Vth (H) set by constant voltage supply 114 to the higher side, switching start comparator 115 resets waiting mode RS flip-flop 111. As waiting mode RS flip-flop 111 is reset, ON-OFFRS flip-flop 105 is released from the reset state thereof. As ON-OFF RS flip-flop 105 is released from the reset state thereof, it becomes possible to set ON-OFF RS flip-flop 105 and, therefore, switching is permitted.

As an ON-signal is outputted from start pulse generator circuit 104 or ON-timing-signal outputting circuit 106, ON-OFF RS flip-flop 105 is set. As ON-OFF RS flip-flop 105 is set, driver circuit 101 switches on switching device 2 via the output terminal a. As a current flows through switching device 2, a voltage is generated across current detecting resistor 10 and the voltage proportional to the current value is inputted to the input terminal d. Waiting mode comparator 121 compares the current value signal inputted from the input terminal d with the setting value set in constant voltage supply 122. As the current value signal exceeds the setting value to the higher side, waiting mode comparator 121 outputs a turnoff signal (H-level).

Since changeover-signal outputting circuit 107 is outputting a waiting mode signal (H-level) at this time, the output of AND gate 126 and the output of OR gate 127 are set at the H-level. As the output of OR gate 127 is set at the H-level, ON-OFF RS flip-flop 105 is reset. As ON-OFF RS flip-flop 105 is reset, driver circuit 101 switches off switching device 2 via the output terminal a. During the period, for which waiting mode RS flip-flop 111 is in the reset state thereof, control circuit 3 makes switching device 2 conduct switching operations thereof at a certain peak current value.

Switching stop comparator 113 compares the feedback signal with the setting value of constant voltage supply 112. As the feedback signal exceeds the switching stop voltage Vth (L) set by constant voltage supply 112 to the lower side, switching stop comparator 113 sets waiting mode RS flip-flop 111. As waiting mode RS flip-flop 111 is set, ON-OFF RS flip-flop 105 is reset. As ON-OFF RS flip-flop 105 is reset, it becomes impossible to set ON-OFF RS flip-flop 105 and switching is inhibited. When waiting mode RS flip-flop 111 is in the set state thereof, control circuit 3 does not make switching device 2 conduct switching operations and keeps stopping the switching operations of switching device 2 until the feedback signal exceeds the switching start signal Vth (H) to the higher side.

FIG. 12 is a wave chart describing the operations of the conventional switching power supply circuit shown in FIG. 10. FIG. 12 shows the output voltage waveform when the load is light, the feedback signal waveform, the output waveform of waiting mode RS flip-flop 111, and the exciting current waveform of transformer 6.

As shown in FIG. 12, the variation of the feedback signal changes the state of waiting mode RS flip-flop 111. When waiting mode RS flip-flop 111 is in the set state, control circuit 3 conducts the switching operations thereof at a certain peak current value. Control circuit 3 controls the burst duty determined by the ratio of the switching period and the switching delay to stabilize the output voltage at a desired value.

As described in detail above, the switching power supply circuit disclosed in the Patent Document 1 limits the peak transformer exciting current to be lower than a certain value to reduce the transformer excitation noise in the waiting mode of operations. However, when the load becomes heavier than assumed, the energies fed to the secondary side of the transformer are insufficient, causing a low output voltage.

In view of the foregoing, it would be desirable to provide a control system for controlling a switching power supply circuit that facilitates preventing the output voltage of the switching power supply circuit from lowering even when the load becomes heavier than assumed in the waiting mode of operations.

Further objects and advantages of the invention will be apparent from the following description of the invention.

SUMMARY OF THE INVENTION

According to the invention, the switching power supply circuit, which stops switching to reduce the electric power consumption when the load is light, is provided with a first setting value for limiting the exciting current of the transformer at the changeover from the switching delay to the switching period and a second setting value for limiting the exciting current of the transformer at the changeover from the switching period to the switching delay. By changing the first and second setting values gradually, the transformer exciting current is prevented from changing rapidly and the transformer excitation noise is reduced. Further, by changing the first and second setting values gradually, the output voltage is prevented from lowering even when the load becomes heavier than it is assumed in the state of light load.

Advantageously, a capacitor, charged at the beginning of the switching period and discharged at the end of the switching period, is disposed, the voltage across the capacitor when the capacitor is charged is used for the first setting value; and the voltage across the capacitor when the capacitor is discharged is used for the second setting value. The transformer excitation noise caused at the beginning and end of switching are reduced.

Advantageously, a comparator for comparing the voltage across the capacitor with the feedback signal is disposed, the capacitor is charged when the voltage across the capacitor is smaller than the feedback signal in the switching period and the capacitor is discharged when the voltage across the capacitor is larger than the feedback signal in the switching period to make the voltage across the capacitor slowly follow the feedback signal, and the voltage across the capacitor is used for the reference value for the peak exciting current of the transformer. By making the voltage across the capacitor slowly follow the feedback signal and by using the voltage across the capacitor for the reference value for the peak exciting current of the transformer, any rapid change is prevented from causing when the switching device is switched on and the transformer excitation noise caused by the intermittent switching are reduced.

By raising the first setting value at the start of the switching power supply circuit and by gradually increasing the reference value for the peak exciting current of the transformer, an overcurrent is prevented from causing in the switching device at the start of the switching power supply circuit and the control circuit is simplified.

By gradually raising or lowering the first setting value at the time of changeover from the normal mode of operations to the waiting mode of operations or vice versa and by increasing or reducing the reference value for the peak exciting current of the transformer gradually, the transformer excitation noise caused by the mode changeover are reduced.

By setting a third setting value for detecting the lowering of the feedback signal, by setting a fourth setting value larger than the third setting value for detecting the rising of the feedback signal, by setting the period from the timing, at which the feedback exceeds the third setting value to the lower side, until the timing, at which feedback exceeds the fourth setting value to the higher side, to be the switching delay, and by setting the period from the timing, at which the feedback signal exceeds the fourth setting value to the higher side, until the timing, at which feedback signal exceeds the third setting value to the lower side, to be the switching period, the switching period is changed over to the switching delay or vice versa automatically.

By lowering the fourth setting value closely to the third setting value but not so greatly that the fourth setting value actually falls below the third setting value, a part of the circuit for automatically changing over the switching period to the switching delay or vice versa is used for preventing the output voltage from rising abnormally when the load is light in the normal mode of operations and the control circuit is simplified.

According to the invention, it is possible to obtain a function for reducing the transformer excitation noise in the waiting mode of operations, a function for preventing an overcurrent from flowing in the switching device at the start of the switching power supply circuit, and a function for preventing the output voltage from lowering when the load becomes heavier than assumed in the waiting mode of operations.

DETAILED DESCRIPTION OF PREFERRED EMBODIMENTS

Now the invention will be described in detail hereinafter with reference to the accompanied drawing figures which illustrate the preferred embodiments of the invention.

Figure 1:
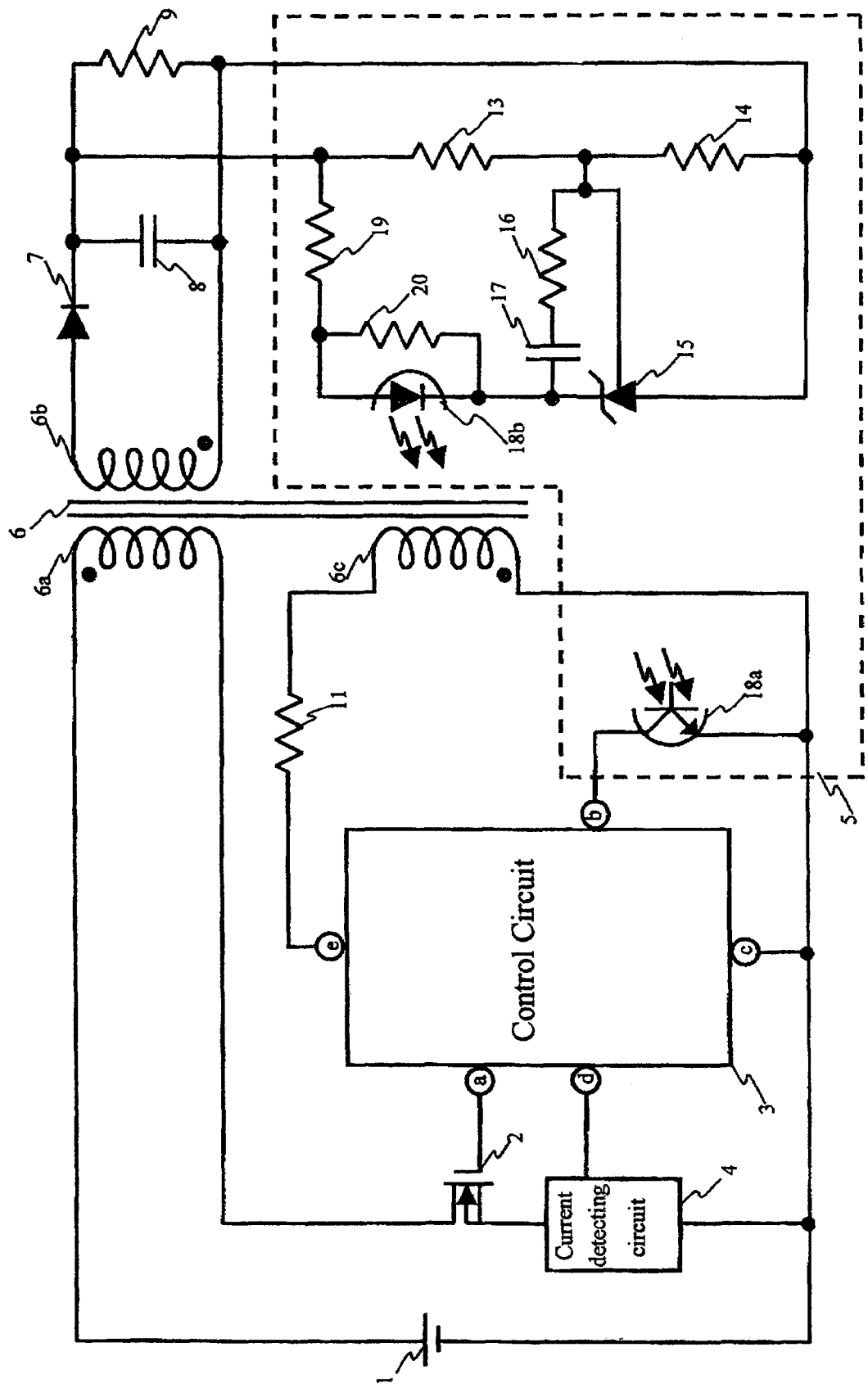
FIG. 1 is a block circuit diagram of a switching power supply circuit according to a first embodiment of the invention.

FIG. 1 is a block circuit diagram of a switching power supply circuit according to a first embodiment of the invention.

Figure 10:
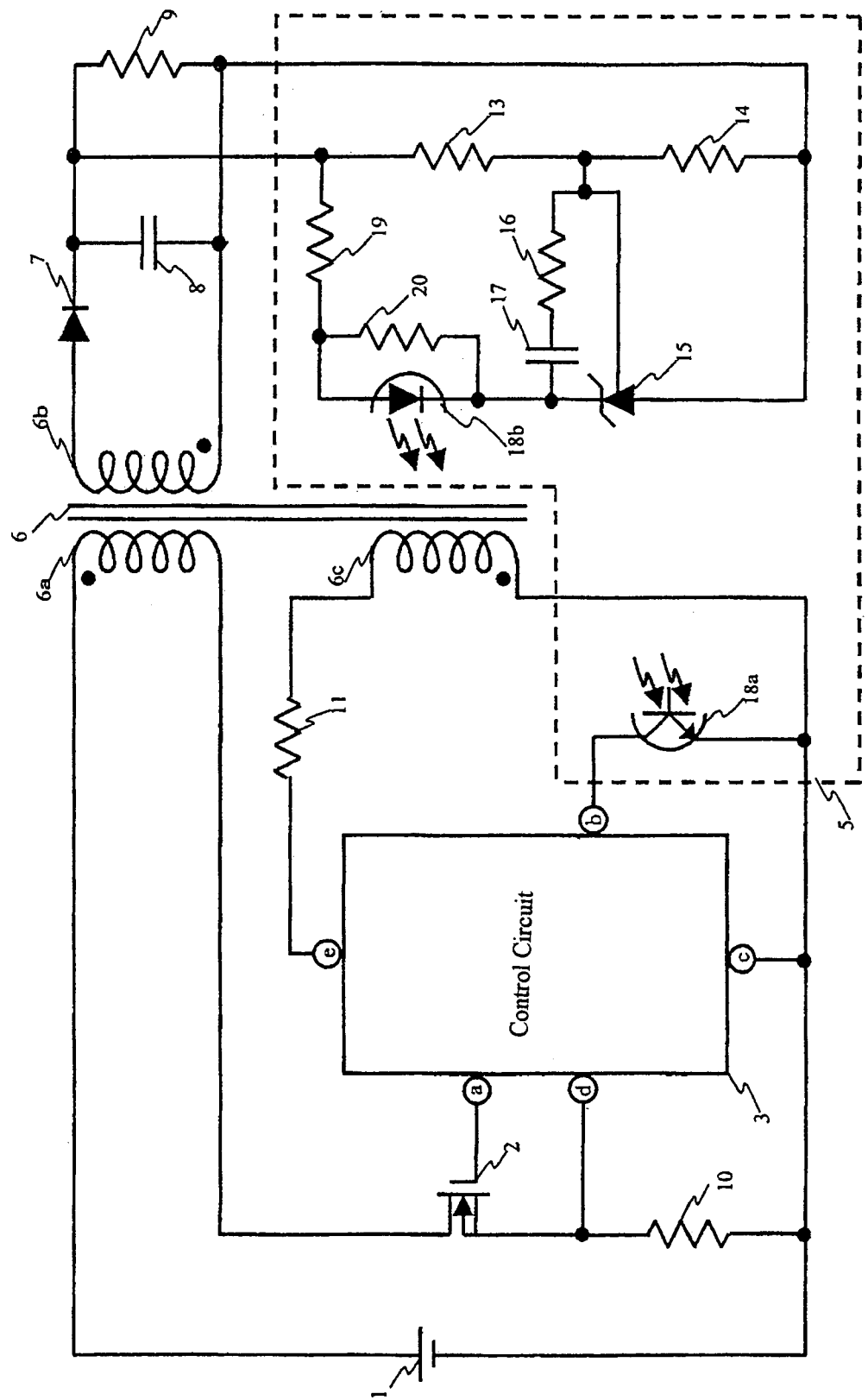
FIG. 10 is a block circuit diagram of the switching power supply circuit disclosed in the Patent Document 1.

Referring now to FIG. 1, the switching power supply circuit according to the first embodiment is different from the conventional switching power supply circuit shown in FIG. 10, in that current detecting resistor 10 in the conventional switching power supply circuit is replaced by a current detecting circuit 4 in the switching power supply circuit. Since the operations of the switching power supply circuit according to the first embodiment are the same with those of the conventional switching power supply circuit shown in FIG. 10, redundant descriptions are omitted.

Figure 2:
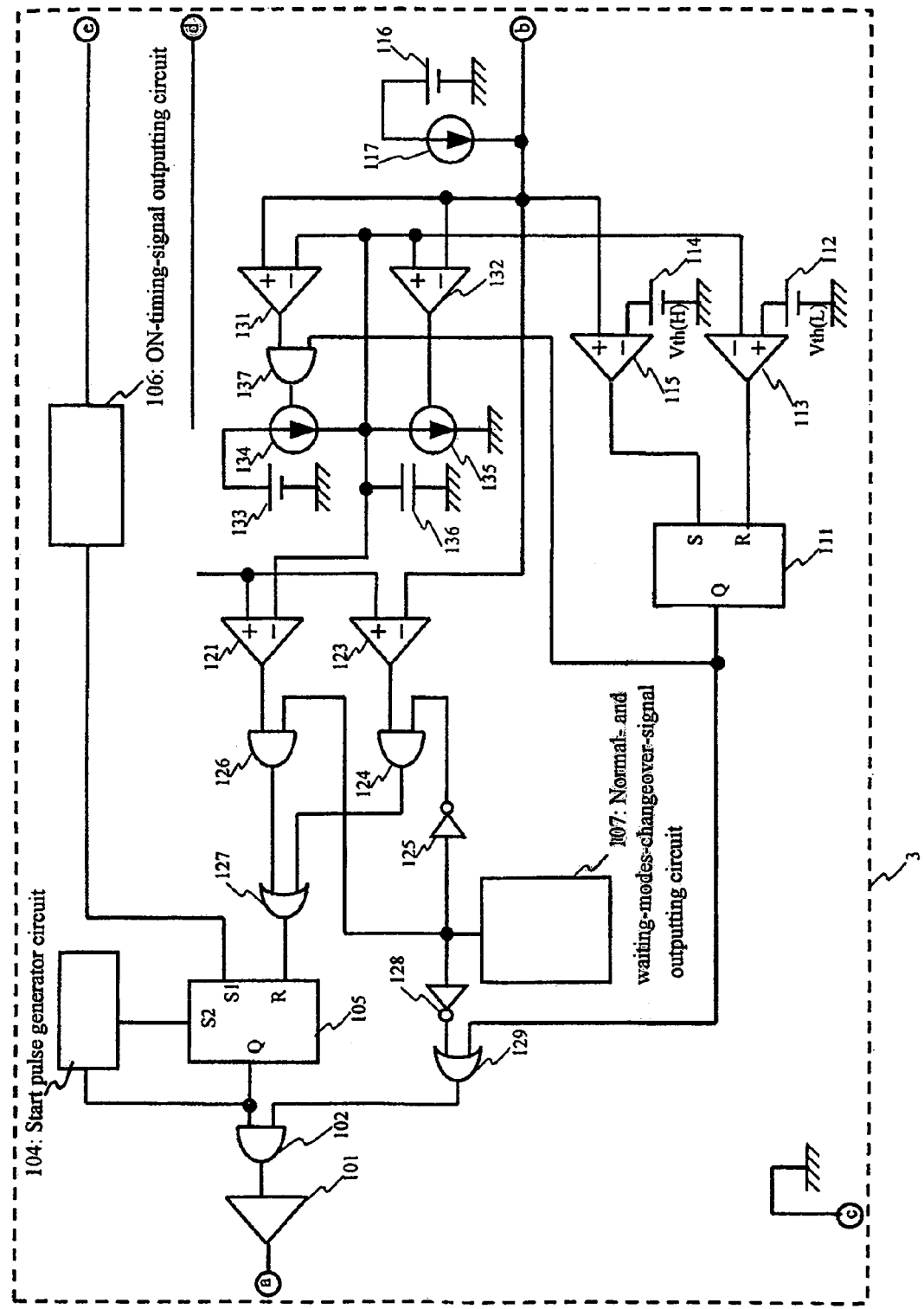
FIG. 2 is a block circuit diagram of a control circuit shown in FIG. 1.
Figure 11:
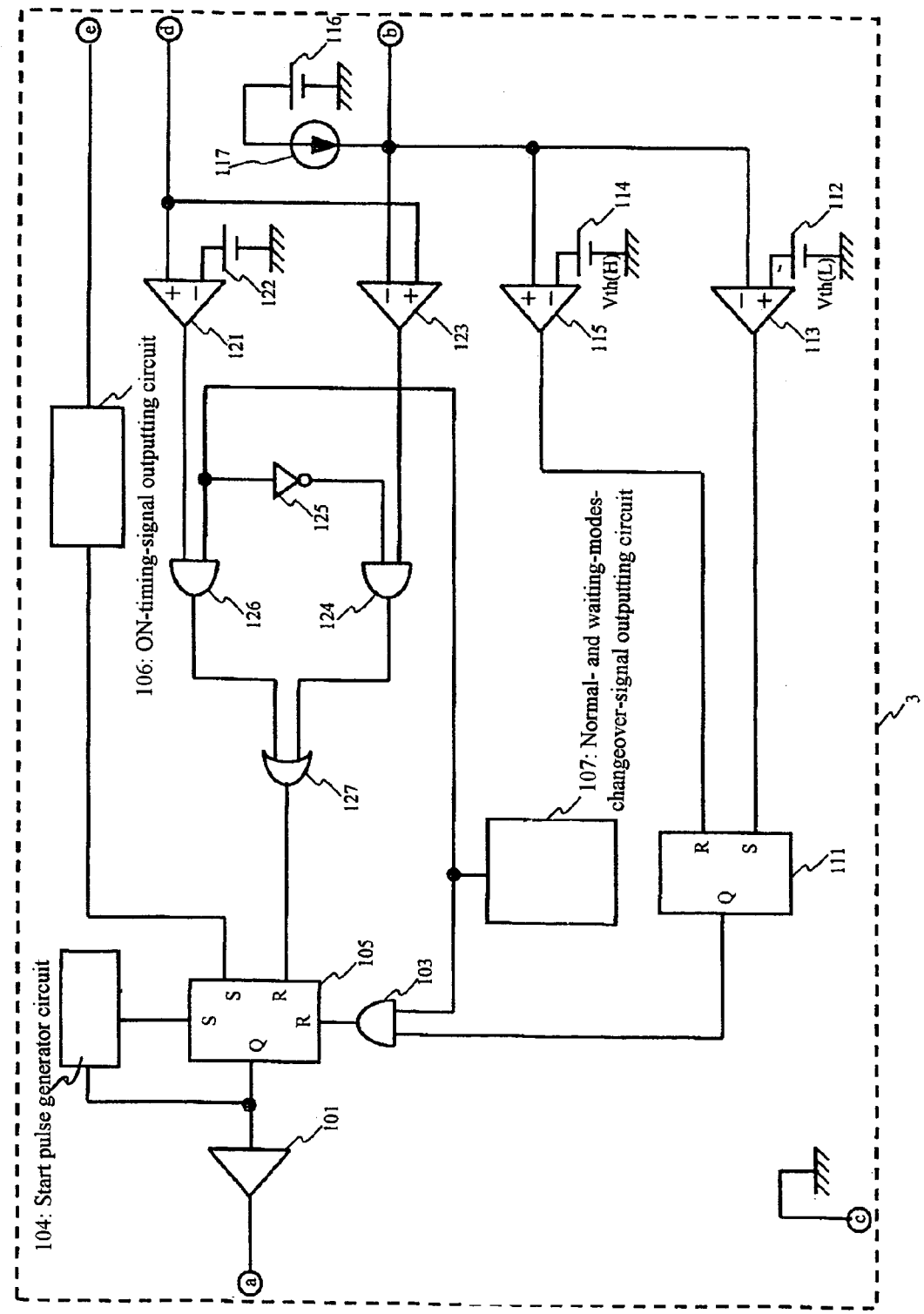
FIG. 11 is a block circuit diagram of the control circuit shown in FIG. 10.
Figure 12:
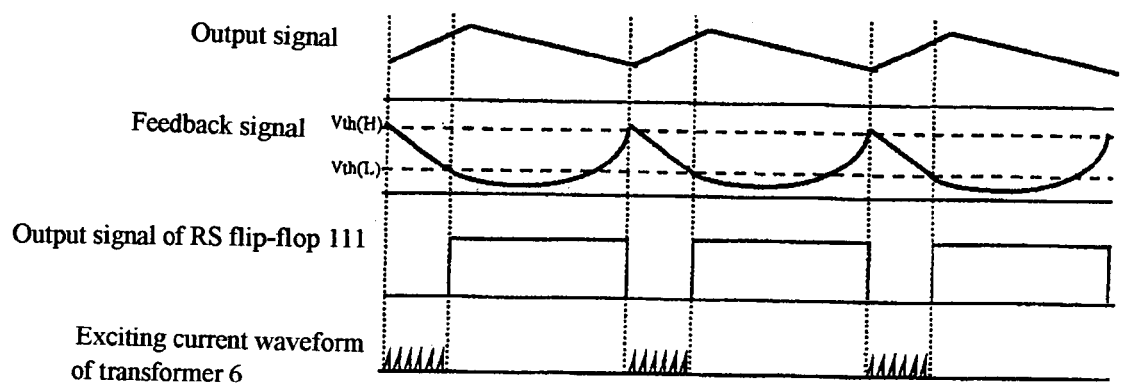
FIG. 12 is a wave chart describing the operations of the conventional switching power supply circuit shown in FIG. 10.

FIG. 2 is a block circuit diagram of the control circuit shown in FIG. 1. The control circuit shown in FIG. 2 is an improvement of the control circuit shown in FIG. 11. In detail, a NOT gate 128, an OR gate 129, a charging comparator 131 for judging the charging conditions, a discharging comparator 132 for judging the discharging conditions, a constant voltage supply 133, constant current supplies 134, and 135, a capacitor 136, and an AND gate 137 are added to the control circuit shown in FIG. 11.

First, the normal mode of operations of the control circuit shown in FIG. 2 will be described below.

Since changeover-signal outputting circuit 107 is outputting the normal mode signal (L-level) in the normal mode of operations, OR gate 129 is outputting a switching permission signal (H-level). As the power supply to control circuit 3 is established, start pulse generator circuit 104 outputs the start pulses and sets ON-OFF RS flip-flop 105. As ON-OFF RS flip-flop 105 is set, the output of AND gate 102 is set at the H-level and driver circuit 101 switches on switching device 2 via the output terminal a.

As a current flows through switching device 2, current detecting circuit 4 inputs a voltage proportional to the current value to the input terminal d. Normal mode comparator 123 compares the current value signal inputted from the input terminal d with the feedback signal inputted to the input terminal b. As the current value signal exceeds the feedback signal, normal mode comparator 123 outputs an OFF-signal (H-level). Since changeover-signal outputting circuit 107 is outputting the normal mode signal (L-level) at this timing, the output of AND gate 124 and the output of OR gate 127 are set at the H-level.

As the output of OR gate 127 is set at the H-level, ON-OFF RS flip-flop 105 is reset. As ON-OFF RS flip-flop 105 is reset, driver circuit 101 switches off switching device 2 via the output terminal a. As the switching device 2 is switched off, a voltage is generated across secondary winding 6b in transformer 6 and energies are fed to capacitor 8 and load 9 through diode 7. As the energy discharge is completed, the voltage generated across secondary winding 6b reduces. At the same time, the voltage generated across control winding 6c connected to the input terminal c also reduces.

As ON-timing-signal outputting circuit 106 detects the trailing edge of the voltage generated across control winding 6c and inputted to the input terminal c, ON-timing-signal outputting circuit 106 sets ON-OFF RS flip-flop 105. As ON-OFF RS flip-flop 105 is set, driver circuit 101 switches on switching device 2 via the output terminal a. As a current flows through switching device 2 and the current value signal exceeds the feedback signal to the higher side, normal mode comparator 123 outputs the OFF-signal. As the OFF-signal is outputted, ON-OFF RS flip-flop 105 is reset and driver circuit 101 switches off switching device 2.

Control circuit 3 switches on switching device 2 in response to the ON-signal from start pulse generator circuit 104 or the ON-signal from ON-timing-signal outputting circuit 106. Control circuit 3 switches off switching device 2 in response to the OFF-signal from normal mode comparator 123. Control circuit 3 controls the ON-period of switching device 2 to stabilize the output voltage of the switching power supply circuit at a desired value. The control circuit shown in FIG. 2 conducts the normal mode of operations in the same manner as the control circuit shown in FIG. 11.

Now the waiting mode of operations will be described below.

Since changeover-signal outputting circuit 107 is outputting the waiting mode signal (H-level) in the waiting mode of operations, OR gate 129 outputs a switching permission signal (H-level) only when the output of waiting mode RS flip-flop 111 is at the H-level. Switching start comparator 115 compares the feedback signal with the setting value set by constant voltage supply 114. As the feedback signal exceeds the switching start voltage Vth (H) set by constant voltage supply 114 to the higher side, switching start comparator 115 sets waiting mode RS flip-flop 111. As waiting mode RS flip-flop 111 is set, OR gate 129 outputs the switching permission signal (H-level). Thus, switching is permitted.

Charging comparator 131 compares the feedback signal with the voltage of capacitor 136. As the feedback signal exceeds the voltage of capacitor 136 to the higher side, charging comparator 131 outputs an H-level signal. Since the voltage of capacitor 136 is 0 immediately before the switching permission signal is outputted, charging comparator 131 is outputting the H-level signal. As waiting mode RS flip-flop 111 is set, the output of AND gate 137 is set at the H-level. As the output of AND gate 137 is set at the H-level, constant current supply 134 charges capacitor 136 with a constant current and the voltage of capacitor 136 rises gradually.

As an ON-signal is outputted from start pulse generator circuit 104 or ON-timing-signal outputting circuit 106, ON-OFF RS flip-flop 105 is set. As ON-OFF RS flip-flop 105 is set while OR gate 129 is outputting the switching permission signal, driver circuit 101 switches on switching device 2 via the output terminal a. As a current flows through switching device 2, a voltage proportional to the current value is inputted from current detecting circuit 4 to the input terminal d. Waiting mode comparator 121 compares the current value signal inputted from the input terminal d with the voltage of capacitor 136. As the current value signal exceeds the voltage of capacitor 136 to the higher side, waiting mode comparator 121 outputs a turnoff signal (H-level).

Since changeover-signal outputting circuit 107 is outputting the waiting mode signal (H-level) at this timing, the output of AND gate 126 and the output of OR gate 127 are set at the H-level. As the output of OR gate 127 is set at the H-level, ON-OFF RS flip-flop 105 is reset. As ON-OFF RS flip-flop 105 is reset, driver circuit 101 switches off switching device 2 via the output terminal a.

Thus, the exciting current is prevented from rapidly increasing and the transformer excitation noise is reduced by increasing the exciting current gradually using the voltage of capacitor 136 that rises gradually for a setting value.

Discharging comparator 132 compares the feedback signal with the voltage of capacitor 136. As the feedback signal exceeds the voltage of capacitor 136 to the lower side, discharging comparator 132 outputs an H-level signal. As discharging comparator 132 is set at the H-level, constant current supply 135 discharges capacitor 136 with a constant current. The voltage of capacitor 136 is reduced gradually. Thus, the exciting current is prevented from rapidly reducing and the transformer excitation noise are reduced by reducing the exciting current gradually using the voltage of capacitor 136 that lowers gradually to a setting value.

Switching stop comparator 113 compares the voltage of constant voltage supply 112 with the voltage of capacitor 136. As the voltage of capacitor 136 exceeds the switching stop voltage Vth (L) set by constant voltage supply 112 to the lower side, switching stop comparator 113 resets waiting mode RS flip-flop 111. As waiting mode RS flip-flop 111 is reset, OR gate 129 outputs the switching inhibition signal (L-level) to inhibit switching. Switching is stopped until the feedback signal exceeds the switching start signal Vth (H) to the higher side and waiting mode RS flip-flop 111 is set.

Figure 3:
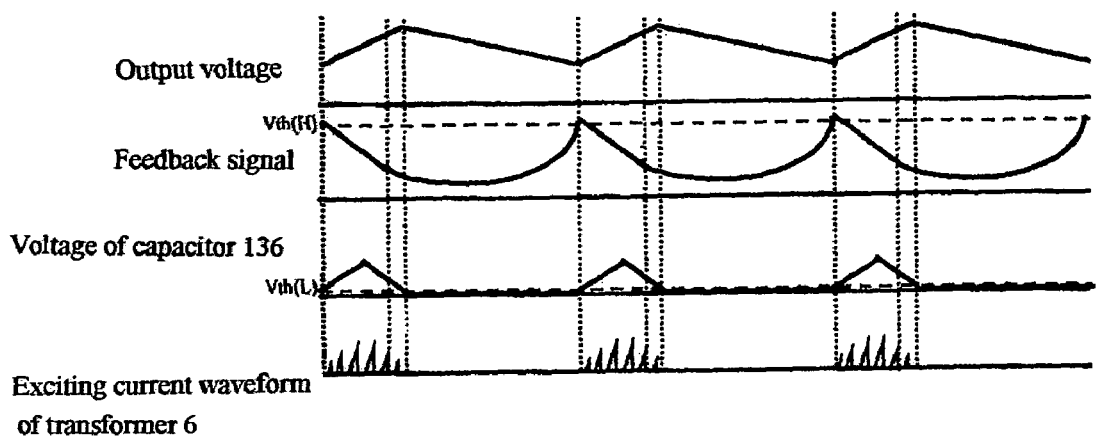
FIG. 3 is a wave chart describing the operations of the switching power supply circuit shown in FIG. 1.

FIG. 3 is a wave chart describing the operations of the conventional switching power supply circuit shown in FIG. 1. FIG. 3 and shows the output voltage waveform in the waiting mode of operations, the feedback signal waveform, the voltage waveform of capacitor 136, and the exciting current waveform of transformer 6. As shown in FIG. 3, the variation of the feedback signal changes the voltage of capacitor 136 slowly. Since control circuit 3 controls the peak current value using the voltage of capacitor 136, the peak exciting current of transformer 6 also changes slowly. Control circuit 3 controls both the burst duty and the peak exciting current to stabilize the output voltage at a desired value. In the waiting mode of operations, control circuit 3 increases the peak exciting current value in response to the feedback signal and feeds the energies equivalent to the energies fed in the normal mode of operations.

Thus, a switching power supply circuit, which facilitates reducing the transformer excitation noise caused in the waiting mode of operations and preventing the output voltage thereof from lowering even when the load becomes heavier than the assumed one for the waiting mode, is obtained.

Figure 4:
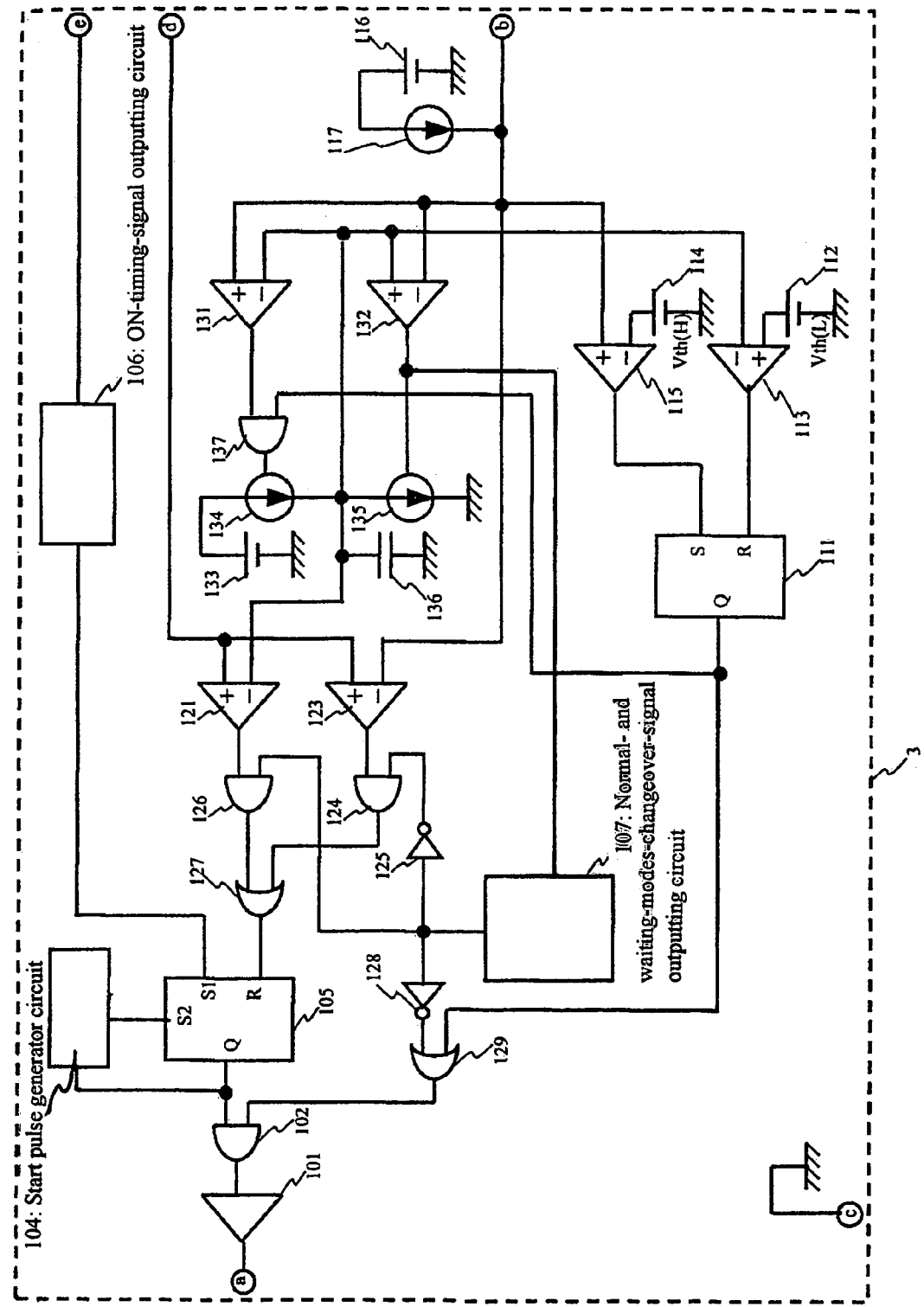
FIG. 4 is a block circuit diagram of a control circuit according to a second embodiment of the invention.

FIG. 4 is a block circuit diagram of a control circuit according to a second embodiment of the invention.

The control circuit according to the second embodiment is different from the control circuit according to the first embodiment shown in FIG. 2, in that the output of discharging comparator 132 is connected to changeover-signal outputting circuit 107 in the control circuit shown in FIG. 4. Since the other circuit configurations are the same with those shown in FIG. 2, their duplicated descriptions are omitted.

At the start of the switching power supply circuit, changeover-signal outputting circuit 107 outputs the waiting mode signal (H-level). Switching start comparator 115 compares the feedback signal with the setting value of constant voltage supply 114. As feedback signal exceeds the switching start voltage Vth (H) set by constant voltage supply 114 to the higher side, switching start comparator 115 sets waiting mode RS flip-flop 111. As waiting mode RS flip-flop 111 is set, OR gate 129 outputs a switching permission signal (H-level) to permit switching.

Charging comparator 131 compares the feedback signal with the voltage of capacitor 136. As the feedback signal exceeds the voltage of capacitor 136 to the higher side, charging comparator 131 outputs an H-level signal. Since the voltage of capacitor 136 is 0 at the start of the switching power supply circuit, charging comparator 131 is outputting the H-level signal. As waiting mode RS flip-flop 111 is set, the output of AND gate 137 is set at the H-level. As the output of AND gate 137 is set at the H-level, constant current supply 134 charges capacitor 136 with a constant current. The voltage of capacitor 136 rises gradually.

Start pulse generator circuit 104 outputs start pulses and ON-OFF RS flip-flop 105 is set. As ON-OFF RS flip-flop 105 is set while the switching permission signal is being outputted, driver circuit 101 switches on switching device 2 via the output terminal a. As a current flows through switching device 2, a voltage proportional to the current value is inputted from current detecting circuit 4 to the input terminal d. Waiting mode comparator 121 compares the current value signal inputted to the input terminal d with the voltage of capacitor 136. As the current value signal exceeds the voltage of capacitor 136 to the higher side, waiting mode comparator 121 outputs a turnoff signal (H-level).

Since changeover-signal outputting circuit 107 is outputting the waiting mode signal (H-level), the output of AND gate 126 and the output of OR gate 127 are set at the H-level. As the output of OR gate 127 is set at the H-level, ON-OFF RS flip-flop 105 is reset. As ON-OFF RS flip-flop 105 is reset, driver circuit 101 switches off switching device 2 via the output terminal a. By gradually increasing the exciting current at the start of the switching power supply circuit using the gradually rising voltage of capacitor 136, an overcurrent is prevented from causing in switching device 2.

Discharging comparator 132 compares the feedback signal with the voltage of capacitor 136. As the feedback signal exceeds the voltage of capacitor 136 to the lower side, discharging comparator 132 outputs an H-level signal. Changeover-signal outputting circuit 107 outputs the normal mode signal (L-level) at the timing, at which discharging comparator 132 is set at the H-level. After this, the normal mode of operations and the waiting mode of operations are conducted in the same manner as by the control circuit shown in FIG. 2.

Figure 5:
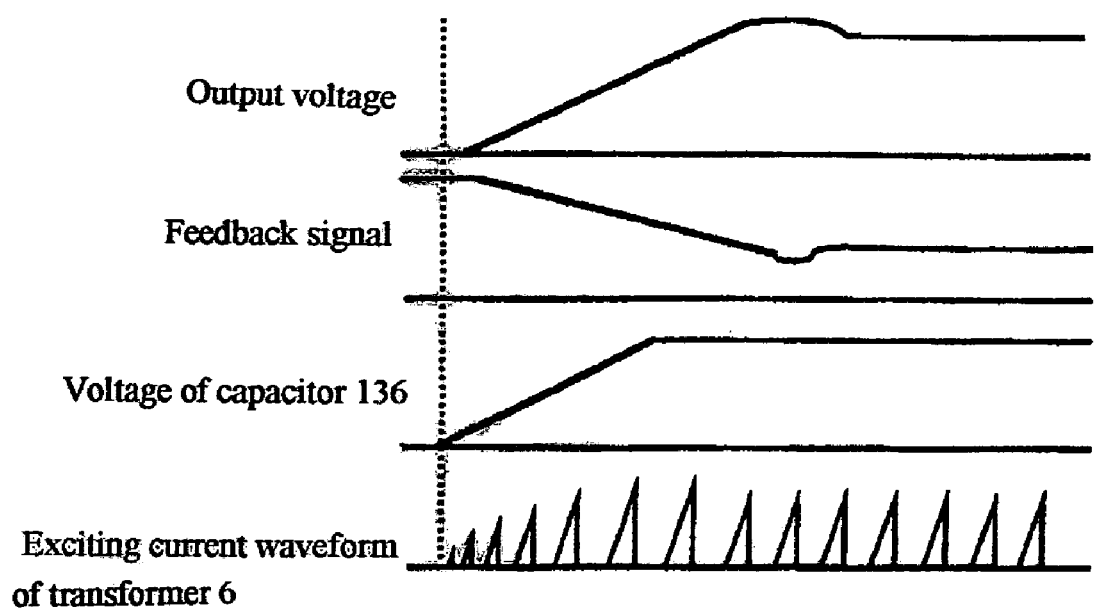
FIG. 5 is a wave chart describing the operations of the control circuit shown in FIG. 4.

FIG. 5 is a wave chart describing the operations of the control circuit shown in FIG. 4. FIG. 5 shows the output voltage waveform at the start of the switching power supply circuit, the feedback signal waveform, the voltage waveform of capacitor 136, and the exciting current waveform of transformer 6. Since control circuit 3 controls the peak current value using the slowly rising voltage of capacitor 136, the peak exciting current value of transformer 6 also increases slowly.

The circuit shown in FIG. 4 facilitates providing the switching power supply circuit with a function of preventing the overcurrent from causing in switching device 2 at the start of the switching power supply circuit.

Figure 6:
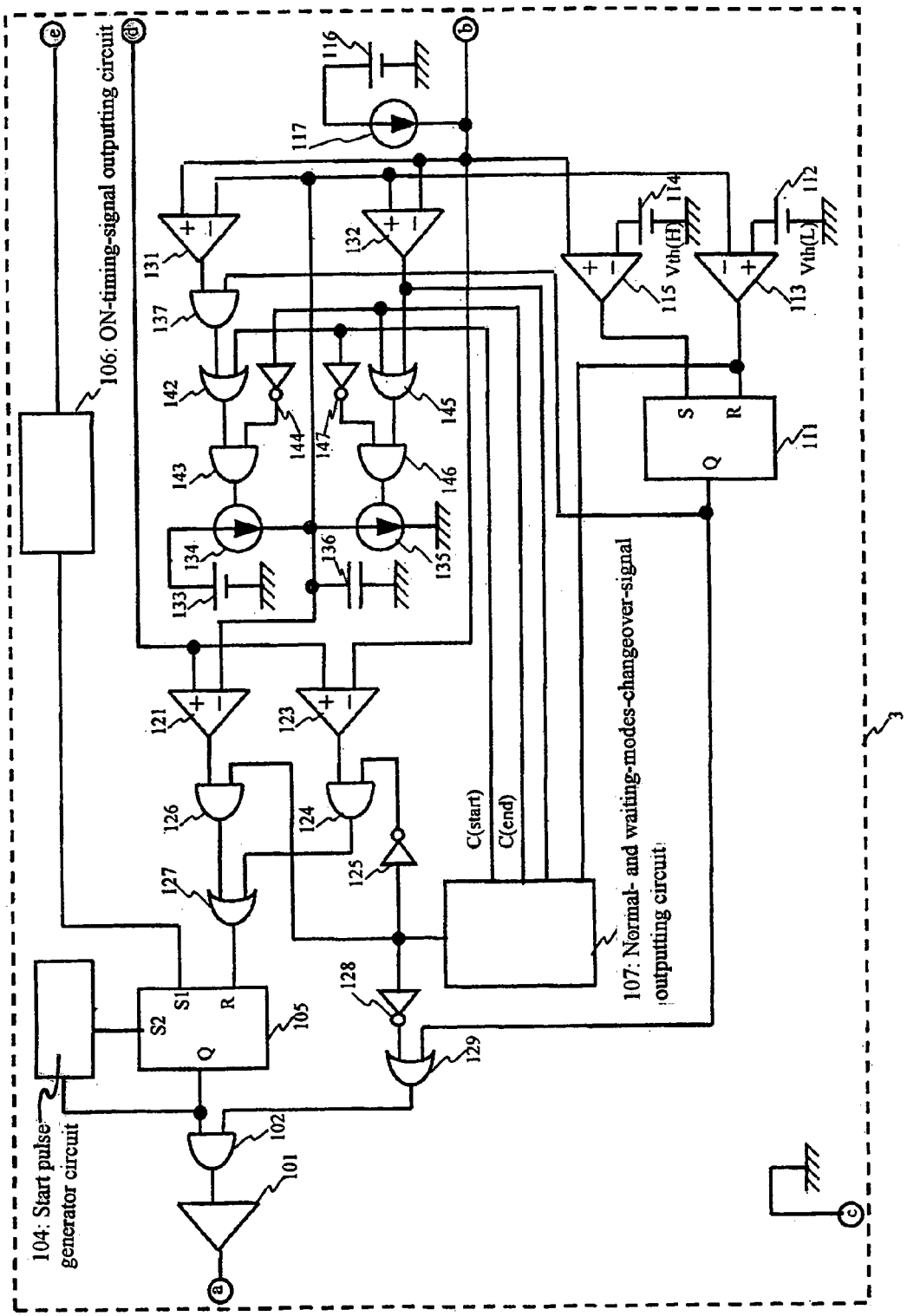
FIG. 6 is a block circuit diagram of a control circuit according to a third embodiment of the invention.

FIG. 6 is a block circuit diagram of a control circuit according to a third embodiment of the invention.

The control circuit shown in FIG. 6 is different from the control circuit shown in FIG. 2 in that the output of waiting mode RS flip-flop 111 and the output of discharging comparator 132 are connected to changeover-signal outputting circuit 107, and a start signal C(start) and an end signal C(end) are outputted from changeover-signal outputting circuit 107. The control circuit shown in FIG. 6 is different from the control circuit shown in FIG. 2 also in that AND gates 143 and 146; OR gates 142 and 145; NOT gates 144 and 147; and such constituent elements are added.

Now the operations of the control circuit shown in FIG. 6 will be described below.

In the waiting mode, changeover-signal outputting circuit 107 keeps the output of the start signal C(start) and the output of the end signal C(end) at the L-level. Since the operations in this case are the same with the waiting mode of operations in FIG. 2, their duplicated descriptions are omitted.

Now the changeover from the waiting mode of operations to the normal mode of operations will be described below.

At the timing, at which waiting mode RS flip-flop 111 is set, changeover-signal outputting circuit 107 outputs the start signal C(start) at the H-level. As the start signal C(start) (H-level) is outputted, the output of OR gate 142 and the output of AND gate 143 are set at the H-level, and the output of NOT gate 147 and the output of AND gate 146 are set at the L-level.

As the output of AND gate 143 is set at the H-level, capacitor 136 is charged by constant current supply 135 with a constant current. As the output of AND gate 146 is set at the L-level, the discharging from constant current supply 135 is inhibited. The voltage of capacitor 136, charged by constant current supply 135 with a constant current, rises gradually. Discharging comparator 132 compares the voltage of capacitor 136 with the feedback signal. As the voltage of capacitor 136 exceeds the feedback signal to the higher side, the output of discharging comparator 132 is set at the H-level.

At the timing, at which the output of discharging comparator 132 is set at the H-level, changeover-signal outputting circuit 107 outputs the waiting mode signal (H-level). Since changeover-signal outputting circuit 107 changes over the modes under the conditions, under which the voltage of the capacitor 136 and the feedback signal are equal to each other, the exciting current is prevented from changing rapidly and the transformer excitation noise are reduced. In the normal mode of operations, changeover-signal outputting circuit 107 keeps outputting the start signal C(start) (H-level). The voltage of the capacitor 136 rises to the upper limit determined by the charging voltage of constant voltage supply 133 and keeps a constant value. Since the normal mode of operations is conducted independently of the voltage of capacitor 136, the normal mode of operations is conducted in the same manner as in FIG. 2.

Now the changeover from the normal mode of operations to the waiting mode of operations will be described below.

Changeover-signal outputting circuit 107 sets the start signal C(start) at the L-level and outputs the end signal C(end) at the H-level. As the end signal C(end) is outputted, the output of OR gate 145 and the output of AND gate 146 are set at the H-level, and the output of NOT gate 144 and the output of AND gate 143 are set at the L-level. As the output of AND gate 143 is set at the L-level, constant current supply 135 discharges capacitor 136 with a constant current. As the output of AND gate 143 is set at the L-level, the charging from constant current supply 134 is inhibited. Since constant current supply 135 conducts discharging with a constant current, the voltage of capacitor 136 lowers gradually.

Discharging comparator 132 compares the voltage of capacitor 136 with the feedback signal. As the voltage of capacitor 136 exceeds the feedback signal to the lower side, the output of discharging comparator 132 is set at the L-level. At the timing, at which the output of discharging comparator 132 is set at the L-level, changeover-signal outputting circuit 107 sets the end signal C(end) at the L-level and outputs the waiting mode signal (H-level). Since changeover-signal outputting circuit 107 changes over the modes under the conditions, under which the voltage of the capacitor 136 and the feedback signal are equal to each other, the exciting current is prevented from changing rapidly and the transformer excitation noise are reduced.

Figure 7:
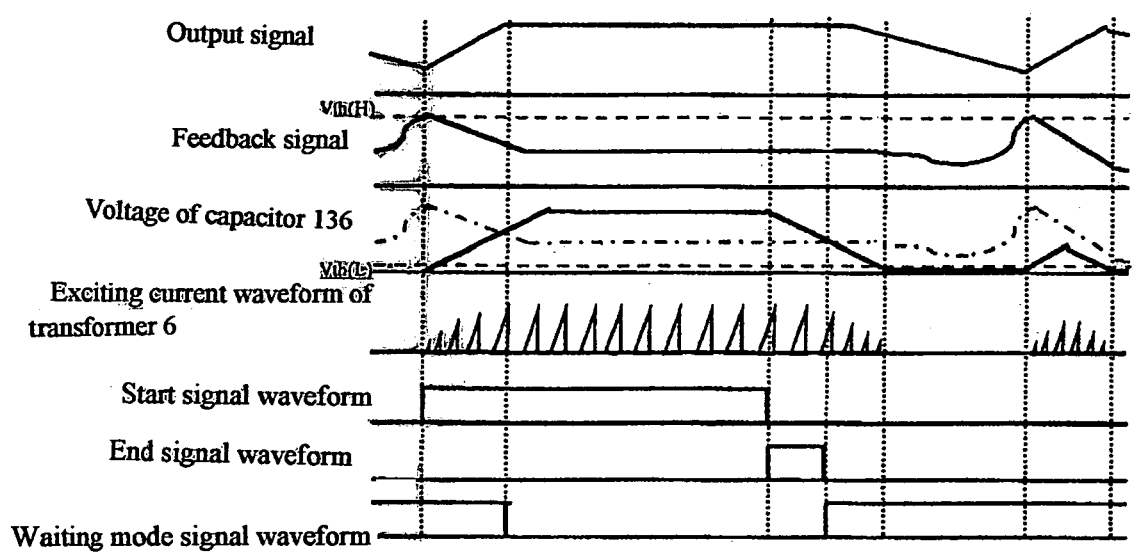
FIG. 7 is a wave chart describing the operations of the control circuit shown in FIG. 6.

FIG. 7 shows the output voltage waveform at the time of mode changeover, the feedback signal waveform, the voltage waveform of capacitor 136, the exciting current waveform of transformer 6, the start signal waveform, the end signal waveform, and the waiting mode signal waveform. The voltage of capacitor 136 rises at the timing, at which the waiting mode of operations is changed over to the normal mode of operations, and reduces at the timing, at which the waiting mode of operations is changed over to the normal mode of operations. Since changeover-signal outputting circuit 107 changes over the modes under the conditions, under which the voltage of the capacitor 136 and the feedback signal are equal to each other, the peak transformer exciting current changes slowly.

The circuit shown in FIG. 6 facilitates reducing the transformer excitation noise caused at the operation mode changeover.

Figure 8:
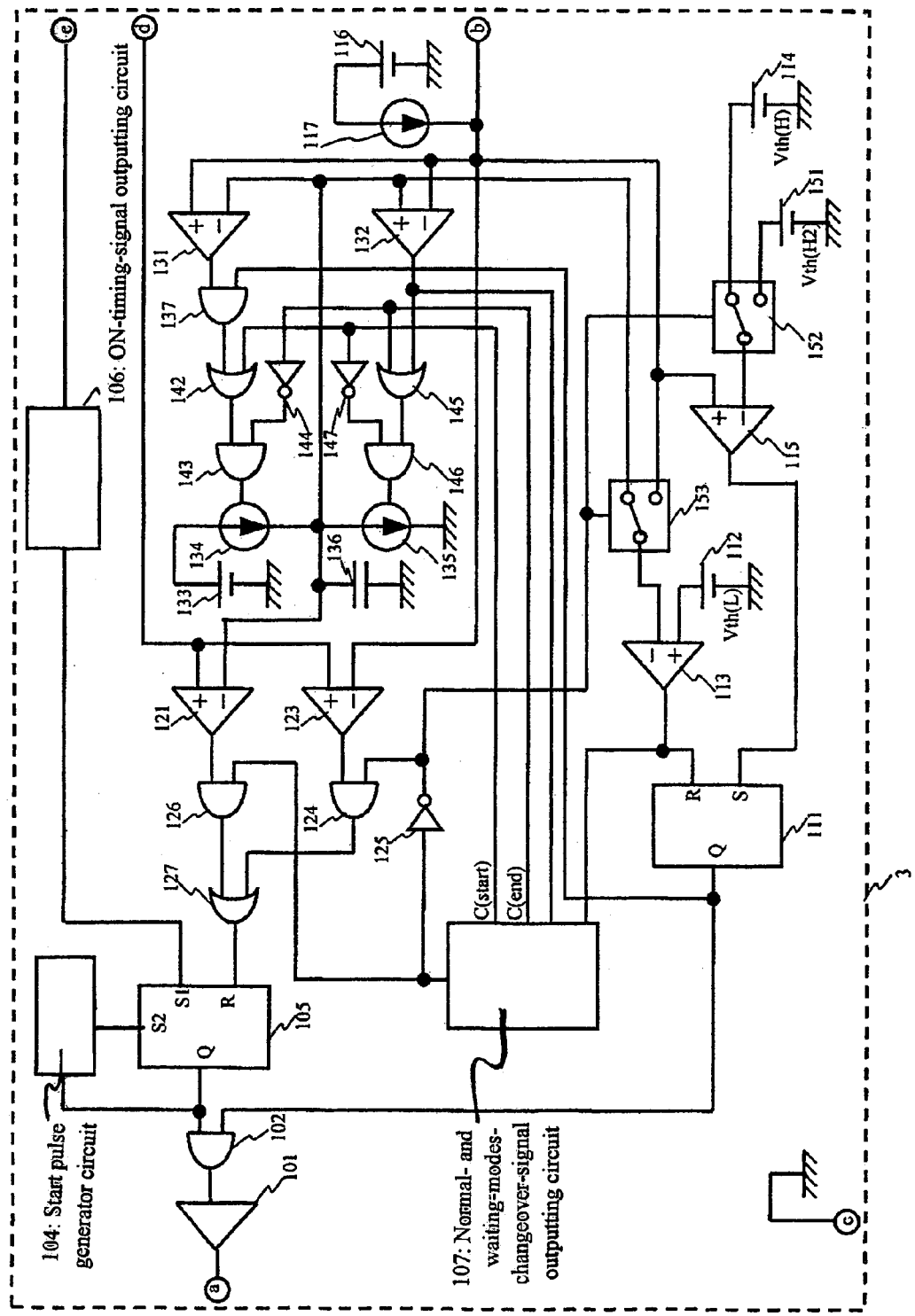
FIG. 8 is a block circuit diagram of a control circuit according to a fourth embodiment of the invention.

FIG. 8 is a block circuit diagram of a control circuit according to a fourth embodiment of the invention.

Since the control circuit shown in FIG. 8 is different from the control circuit shown in FIG. 6 in that NOT gate 128 and OR gate 129 are not included in the control circuit shown in FIG. 8 but a constant voltage supply 151 and signal changeover circuits 152, 153 are included in the control circuit shown in FIG. 8, the descriptions will be directly mainly to the above described differences.

Since NOT gate 125 outputs an L-level signal in the waiting mode of operations, signal changeover circuit 152 outputs the voltage of constant voltage supply 114 and signal changeover circuit 153 outputs the voltage of capacitor 136. Since the waiting mode of operations is conducted in the same manner as in FIG. 6, their descriptions are omitted.

Now the normal mode of operations will be described below.

Since NOT gate 125 is outputting an H-level signal in the normal mode of operations, signal changeover circuit 152 outputs the voltage of constant voltage supply 151 and signal changeover circuit 153 outputs the feedback signal. Switching start comparator 115 compares the feedback with the set voltage of constant voltage supply 151. A second switching start voltage Vth (H2) set by constant voltage supply 151 is set at a low value not exceeding the switching stop voltage Vth (L) to the lower side.

As the feedback signal exceeds the second switching start voltage Vth (H2) to the higher side, the output of switching start comparator 115 is set at the H-level. As the output of switching start comparator 115 is set at the H-level, waiting mode RS flip-flop 111 is set. As waiting mode RS flip-flop 111 is set, switching is permitted. As switching is permitted and ON-OFF RS flip-flop 105 is set, the output of AND gate 102 is set at the H-level and control circuit 3 start switching on and off switching device 2. Since the operations of control circuit 3 while the switching is permitted are the same with those described with reference to FIG. 6, their detailed descriptions are omitted.

As the output voltage rises due to a light load, output voltage feedback circuit 5 lowers the feedback signal. As the feedback signal exceeds the switching stop voltage Vth (L) to the lower side, the output of switching stop comparator 113 is set at the H-level. As the output of switching stop comparator 113 is set at the H-level, waiting mode RS flip-flop 111 is reset. As waiting mode RS flip-flop 111 is reset, switching is inhibited. As switching is inhibited, control circuit 3 stops switching on and off switching device 2. Therefore, the output voltage is lowered. As a result, an over output voltage is prevented from causing in the normal mode of operations. As the output voltage lowers and the feedback signal exceeds the second switching start voltage Vth (H2) to the higher side, switching is permitted and control circuit 3 resumes switching on and off switching device 2.

Since the changeover from the normal mode of operations to the waiting mode of operations is conducted in the same manner as described with reference to FIG. 6, its duplicated descriptions are omitted. Since the changeover from the waiting mode of operations to the normal mode of operations is conducted also in the same manner as described with reference to FIG. 6, its duplicated descriptions are omitted.

Figure 9:
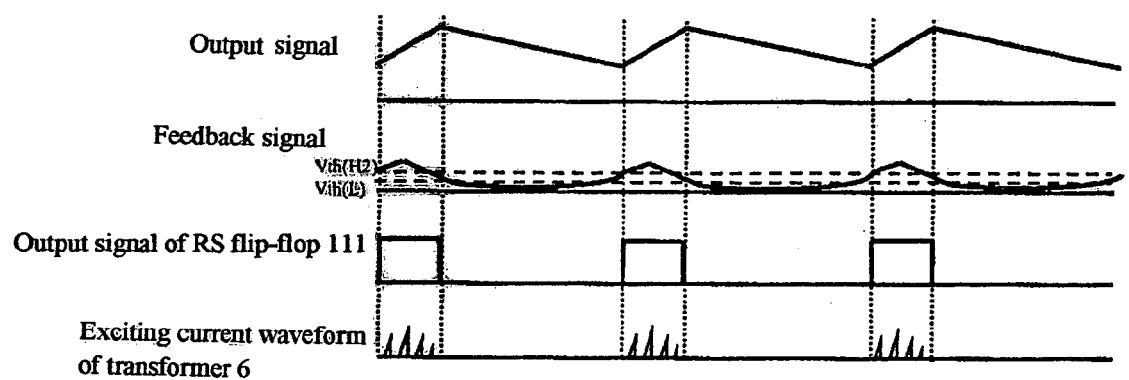
FIG. 9 is a wave chart describing the operations of the control circuit shown in FIG. 8.

FIG. 9 shows the output voltage waveform in the normal mode of operations for a light load, the feedback signal waveform, the output waveform of waiting mode RS flip-flop 111, and the exciting current waveform of transformer 6. As FIG. 9 clearly shows, the output of waiting mode RS flip-flop 111 is set at the L-level by the feedback signal lowering and switching is stopped.

The control circuit shown in FIG. 8, which employs a circuit that determines the switching period and the switching delay in the waiting mode of operations, the output voltage is prevented from rising abnormally during the normal mode of operations when the load is light.

The disclosure of Japanese Patent Application No. 2005-061893 filed on Mar. 7, 2005 is incorporated herein.

While the invention has been explained with reference to the specific embodiments of the invention, the explanation is illustrative, and the invention is limited only by the appended claims.

What is claimed is:

1. A control method for controlling a switching power supply circuit comprising a transformer with a primary winding and a secondary winding, and a switching device connected in series to the primary winding of the transformer, a series circuit of the primary winding and the switching device being connected in parallel to a DC power supply so that when the switching device is switched on and off, a voltage across the secondary winding of the transformer is rectified and smoothened to obtain a stable DC output voltage, said control method comprising:
    amplifying a difference between the DC output voltage and a reference voltage to obtain a feedback signal;
    adjusting an ON-period of the switching device using the feedback signal to control the output voltage;
    continuously switching on and off the switching device in a state of normal load to conduct a normal mode of operation;
    intermittently switching on and off the switching device in a state of light load to conduct a waiting mode of operation comprising a switching period and a switching pause period; and
    setting a first setting value for limiting a peak exciting current of the transformer,
    wherein at a beginning of the switching period in the waiting mode of operation, when the first setting value is smaller than the feedback signal, the first setting value is used for a reference value for the peak exciting current of the transformer, and the first setting value is gradually raised.

2. A control method for controlling the switching power supply circuit according to claim 1, further comprising setting a second setting value for limiting the peak exciting current of the transformer,
    wherein at an end of the switching period in the waiting mode of operation, when the second setting value is larger than the feedback signal, the second setting value is used for the reference value for the peak exciting current of the transformer, and the second setting value is gradually lowered.

3. A control method for controlling the switching power supply circuit according to claim 2, wherein the switching power supply circuit further comprises a capacitor charged at the beginning of the switching period and discharged at the end of the switching period, a voltage across the capacitor when the capacitor is charged is used for the first setting value, and the voltage across the capacitor when the capacitor is discharged is used for the second setting value.

4. A control method for controlling the switching power supply circuit according to claim 3, wherein the switching power supply circuit further comprises a comparator comparing the voltage across the capacitor with the feedback signal, and the capacitor is charged when the voltage across the capacitor is smaller than the feedback signal in the switching period, and discharged when the voltage across the capacitor is larger than the feedback signal in the switching period, to make the voltage across the capacitor slowly follow the feedback signal, to thereby use the voltage across the capacitor for the reference value for the peak exciting current of the transformer.

5. A control method for controlling the switching power supply circuit according to claims 2, further comprising setting a third setting value for detecting lowering of the feedback signal, and a fourth setting value for detecting rising of the feedback signal, the fourth setting value being larger than the third setting value so that the switch pause period is set from a time at which the feedback signal falls below the third setting value until a time at which the feedback signal exceeds the fourth setting value, and the switching period is set from a time at which the feedback signal exceeds the fourth setting value until a time at which feedback signal falls below the third setting value.

6. A control method for controlling the switching power supply circuit according to claim 5, wherein the fourth setting value is lowered so as to closely approximate the third setting value without lowering below the third setting value in the normal mode of operation.

7. A control method for controlling the switching power supply circuit according to claim 1, wherein at a start of the switching power supply circuit, the first setting value is gradually raised so as to gradually increase the reference value for the peak exciting current of the transformer.

8. A control method for controlling the switching power supply circuit according to claim 1, wherein at a time of changeover from the normal mode of operation to the waiting mode of operation or vice versa, the first setting value is gradually raised or lowered, to increase or reduce the reference value for the peak exciting current of the transformer gradually.

* * * * *

UNITED STATES PATENT AND TRADEMARK OFFICE
CERTIFICATE OF CORRECTION

PATENT NO. : 7,242,596 B2  Page 1 of 1
APPLICATION NO. : 11/206118
DATED : July 10, 2007
INVENTOR(S) : Kenji Fujita et al.

It is certified that error appears in the above-identified patent and that said Letters Patent is hereby corrected as shown below:

Please change column 2, line 64, "ON-OFFRS flip-flop 105" to --ON-OFF RS flip-flop 105--, and Column 8, line 5, "FIG. 3 and shows" to -- FIG. 3 shows--.

Signed and Sealed this

Thirtieth Day of October, 2007

JON W. DUDAS
*Director of the United States Patent and Trademark Office*